(12) United States Patent
Cross

(10) Patent No.: US 12,285,789 B1
(45) Date of Patent: Apr. 29, 2025

(54) SYSTEMS AND METHODS FOR ENVIRONMENTALLY SOUND REPROCESSING AND RECYCLING OF ANIMAL BEDDING FOR PROVIDING POSITIVE HEALTH ASPECTS TO ANIMALS AND HUMANS

(71) Applicant: Paul Cross, Guelph (CA)

(72) Inventor: Paul Cross, Guelph (CA)

( * ) Notice: Subject to any disclaimer, the term of this patent is extended or adjusted under 35 U.S.C. 154(b) by 124 days.

(21) Appl. No.: 17/184,578

(22) Filed: Feb. 24, 2021

(51) Int. Cl.
| | |
|---|---|
| B09B 3/50 | (2022.01) |
| A01K 1/015 | (2006.01) |
| B09B 3/30 | (2022.01) |
| B09B 3/40 | (2022.01) |
| B09B 101/85 | (2022.01) |

(52) U.S. Cl.
CPC ............... B09B 3/50 (2022.01); A01K 1/015 (2013.01); B09B 3/30 (2022.01); B09B 3/40 (2022.01); *B09B 2101/85* (2022.01)

(58) Field of Classification Search
CPC .... B09B 3/50; B09B 3/30; B09B 3/40; B09B 2101/85; A01K 1/015
See application file for complete search history.

(56) References Cited

U.S. PATENT DOCUMENTS

| | | | | |
|---|---|---|---|---|
| 7,043,853 | B2 * | 5/2006 | Roberts ..................... | F26B 9/06 34/396 |
| 2009/0062581 | A1 * | 3/2009 | Appel ..................... | C10G 1/002 422/184.1 |
| 2014/0030203 | A1 * | 1/2014 | Dombeck .............. | A61K 8/365 424/65 |
| 2020/0216760 | A1 * | 7/2020 | Ingolfsson ......... | B01D 17/0217 |
| 2021/0229110 | A1 * | 7/2021 | Köpf ....................... | B02C 21/02 |

OTHER PUBLICATIONS

Finna Sensors, KilnScout-Softwood: Wireless Kiln Moisture Meter System, Jan. 18, 2021, https://web.archive.org/web/20210118225156/ https://finnasensors.com/product/kilnscout-softwood-wireless-kiln-moisture-meter-system/ (Year: 2021).*

* cited by examiner

*Primary Examiner* — Jacob S. Scott
*Assistant Examiner* — Miraj T. Patel
(74) *Attorney, Agent, or Firm* — Maxwell L Minch Esq. PA; Maxwell L Minch

(57) ABSTRACT

The present invention provides systems and methods for the recycling of animal bedding and the disposal or reuse of manure, feces, urine or expectorant resulting from recycling animal bedding. The present invention provides systems and methods for the disposal of materials related to the recycling or repurposing of stall residual waste and/or soiled animal bedding which is environmentally conscious to aquifers, and further limiting off gassing of enteric methane and other gasses. Use of such methods create a healthier recycled bedding than existing new bedding materials. The reusable and clean animal bedding provides for a healthy, hygienic, sanitary and enhanced stall environment. The present invention further provides methods for infusing additives, enhancements or amendments to recycled animal bedding which promote the health and safety of the animals using the recycled animal bedding (or the humans in contact with the animal bedding or animals) and/or the barn environment.

29 Claims, 8 Drawing Sheets

SYSTEMS AND METHODS FOR ENVIRONMENTALLY SOUND REPROCESSING AND RECYCLING OF ANIMAL BEDDING FOR PROVIDING POSITIVE HEALTH ASPECTS TO ANIMALS AND HUMANS

CROSS-REFERENCE TO RELATED APPLICATIONS

This application claims the benefit of U.S. Provisional Application No. 62/957,121, having a filing date of Feb. 24, 2020, the disclosure of which is hereby incorporated by reference in its entirety and all commonly owned.

FIELD OF INVENTION

The present invention relates to the recycling and reprocessing of animal bedding. More particularly, the present relates to methods for recycling and reprocessing animal bedding to provide a recycled animal bedding for redeployment as (healthy) animal bedding, creating a biomass for soil amendment, organic matter fertilizer, absorption pellets, fuel, digestate for Anerobic digestors creating renewable natural gas from methane, and creating a unique infusion tank apparatus that coats shavings with a unique compound formulation for treating recycled or non-recycled animal bedding to promote health of animals and humans in contact with the recycled animal bedding and/or the barn environment.

BACKGROUND

Animal facilities such as farms, barns, or equestrian facilities, to name a few, use large amounts of animal bedding comprising of wood chips, straw, hulls, husks, natural fibers, or other elements. Consequently, as a result of the animals eating, sleeping, defecating, urinating creating manure, as a waste stream, which included pathogens, including, without limit, bacteria and mold, the animal bedding must be replaced regularly to promote the health and safety of the animals and the humans exposed to the animals bedding and exposed to the animals living in the animal bedding or the barn environment.

All manures are not created equal. Dairy manure is mostly wet liquid. Horse manure is mainly dry and is called a road apple or manure bun. A person can break open a manure bun and see undigested hay and grass inside. Horse manure is mixed within the bedding material generally wood shavings, natural wood fiber, sawdust or shell materials, hemp, straw or other bedding material; immixed with fecal matter, urine, water, hay and grass (organics), this makes up the waste product stream. The total stall has many names, animal manure, stall waste stream. Stall residual waste, stall residuals, used bedding, waste bedding, and manure, among others.

Current practices for animal facilities is to regularly remove the stall residual waste and/or soiled animal bedding from an animals' berthing area or stall and transport it to a storage pile. Replacement bedding is then added to the berthing area and/or stall, then raked to provide even sleeping/resident bedding for the animal. The stall residuals and/or soiled animal bedding, which comprises of mostly wood shavings, natural wood fiber, or shell materials, hemp, straw or other bedding material, immixed with fecal matter, urine, water, hay and grass (organics), is removed from the birthing area/stalls and (may be) stockpiled over a period of time. Where stockpiled, the manure contents of the stall residuals/soiled bedding leaches and overflows and off-gasses, thus contaminating the air and local water supplies. Depending on the number of animals at a particular facility, the volume of stall residual waste/soiled bedding may reach such amounts that it requires removing from the animal facility daily. Bins or other devices are then utilized to hold the stall residual waste/used bedding, and then it is trucked away to a site or collection area, where it is dumped for disposal or composting. Similar to stockpiling, the manure contents of the stall residual waste/soiled bedding at the dumping location leaches and overflows and off-gasses, thus contaminating the air and local water supplies. There are limited uses for this stall residual waste/soiled bedding, used bedding at this stage, and it often becomes a nuisance material, accumulating and causing foul odors, leaching, phosphorous overloading, greenhouse gas release\, methane off-gassing and other environmental concerns.

There have been concerns regarding animal manure build-up with contaminates entering land, air and water, causing numerous health concerns to humans. Moreover, the environmental protection agency, as well as several federal and state agencies in the United States, Canada, and other countries around the world have issued several regulations relating to the storage, processing, and run off resulting from accumulated stall residuals waste and animal bedding.

Several used bedding disposal methods have been implemented in the industry. Some methods include repurposing the used animal bedding into fuel, such as pellets, briquettes or logs, but these methods don't allow for the reuse of the processed materials as reusable animal bedding in a single or multiple cycles. Thus, there remains an unmet need for providing recycled animal bedding suitable for redeployment in animal stalls and berthing areas as an animal bedding.

It should be appreciated that the stall residual waste and/or soiled animal bedding may contain diseases or pathogens that were deposited into the bedding by feces, urine or expectorant from the animals. Some methods currently employed include reusing the stall residual waste and/or soiled animal bedding by rinsing and/or washing or sanitizing the stall residual waste and/or soiled animal bedding by exposing the used animal bedding to bleach, chemicals and/or polymers for cleaning, sanitizing, or deodorizing the used animal bedding prior to being redeployed as an animal bedding. However the use of chemicals have been known to become an antagonist to the health and or safety of the animals and humans (and their respiratory systems) who are then exposed to the recycled materials or barn environment. Thus, there remains an unmet need for cleaning and reusing stall residual waste and/or soiled animal bedding to produce a reusable and clean animal bedding which does not expose the animals to harmful chemical, vapor, or polymer residuals remaining in a recycled animal bedding. There further remains an unmet need for providing additives, including natural additives, to recycled animal bedding which promote the health and safety of the animals using the recycled animal bedding (or the humans in contact with the animal bedding or animals or the barn environment). There further remains an unmet need for providing a more efficient method to produce an organic matter soil amendment, fertilizer, fuel source, absorption pellet product or compost without traditional methods of laying stall residuals waste animal bedding in fields or windrows for an extended period of time, while the manure contents leaches and off gasses waiting for it to break down into a usable byproduct.

It should be further appreciated that mold spores, yeast, and other pathogens, may be in "clean" unused bedding (virgin shavings) (in traditional un-recycled bedding) that is subsequently provided into an animal's stall after stall residual waste and/or soiled animal bedding is removed. Moreover, typical "clean" unused bulk bedding left unattended, may have bugs, rodents, and other pests which may carry disease and typically leaves fecal matter immixed with the "clean" unused bedding that are then scooped up and used in the stalls. Unless screened at the source to be dust free, most animal bedding into stalls have a high dust content dependent on quality, screening and/or factory shavings that came from a mill floor creating a sawdust and shaving refuse, reused as virgin animal bedding. Dust from "clean" animal bedding also presents problems to the animals and humans alike, who are in contact with the animal bedding and barn environment. These contaminants, as well as dust from bedding, have been known to potentially cause respiratory problems for both the animals and the humans exposed to the animal bedding or the barn environment, as well as other diseases and infections. Moreover, the health of workers in barns with animals includes dust, flies, bugs, and odors such as ammonia causing health concerns not addressed adequately when using bulk shavings or many traditional stall animal bedding products. Thus there remains an unmet need for providing a truly clean animal bedding that prevents or minimizes mold spores, yeast, pathogens and other contaminants, as well as minimizes dust.

Finally, some reuse of animal bedding includes using the soiled bedding in fields or for composting. Where no recycling take place, and all the used bedding material, including the shavings, fecal manure, urine, etc., is spread on fields, a nutritional imbalance occurs. Even where animal bedding is effectively recycled, and the shavings are separated for reuse, a large amount of manure, feces, urine or expectorant from the animals remains separated and is difficult to dispose of. Some current methods employed include stockpiling or composting the manure, feces, urine or expectorant, and later spreading the compost on land as a soil amendment or fertilizer. Studies of the long-term ramifications of this practice indicate possible nutritional imbalance, nitrate deficient and dilution of soils by the addition of wood products embedded in the manure to the soil and water contamination caused by runoff and leaching of rain and irrigation. Other disposal methods have been employed which installs the stall residuals and/or soiled animal bedding, including the wood shavings, manure, feces, urine or expectorant waste in landfills, however many landfills are not accepting the stall residual waste and/or soiled animal bedding because of its interference with the anaerobic or aerobic decomposition of landfill materials and the simple fact it takes up so much room that does not break down in a timely manner. Nonetheless, the aforementioned disposal methods have adverse effects on aquifers and properties because of odor, bacteria parasites, and leaching concerns, including smell and methane off-gassing of the manure contents. Disposed waste contributes to environmental problems, including habitat destruction, surface and groundwater pollution, and other forms of air, soil, and water contamination. Incineration creates toxic substances, while landfills and spreading on fields emit methane (which contributes to global warming) and other gases. It is further known that if stall residuals are fed to an anaerobic digester, the large wood shavings are no good for gas creation. However, if the wood is separated first then the manure buns urine and dust and small fines left after recycling can be used where only 10% off gassing occurs, the rest turns to gas inside the anaerobic digester for reuse as a liquid natural gas. If dried storage is used 1.5% methane off gassing occurs when kept and dried indoors, thus leaching and off-gassing can still occur.

Thus there remains for an unmet need for the disposal or reuse of manure, feces, urine or expectorant resulting from recycling animal bedding. There further remains an unmet need for the disposal of materials related to the recycling or repurposing of stall residuals and/or soiled animal bedding which is environmentally conscious to aquifers, and further limiting off gassing of enteric methane and other gasses.

SUMMARY OF THE INVENTION

The present invention provides methods for recycled animal bedding suitable for redeployment in animal stalls and berthing areas as an animal bedding. Use of such methods creates healthier bedding than existing bagged shavings, virgin bulk shavings or sawdust.

The present invention further provides for methods for recycling animal bedding which reuse all or a portion of the elements of the waste stream for biofuel, water reclamation, recycled bedding etc. It is believed that if the stall residuals and/or soiled animal bedding are separated and processed as described in the present invention, little to no methane will be off-gassed.

The present invention further provides methods for cleaning and reusing stall residual waste and/or soiled animal bedding to produce a reusable and clean animal bedding which does not expose the animals to harmful chemicals or vapor residuals remaining in a recycled animal bedding. The reusable and clean animal bedding provides for a healthy, hygienic, sanitary and enhanced stall environment. In furtherance of this, the present invention provides for the recycling of animal bedding naturally, without the use of chemicals or polymers, through a process of separation, drying, pasteurization, infusion, and bagging.

The present invention further provides for methods for infusing additives, enhancements or amendments to recycled animal bedding which promote the health and safety of the animals using the recycled animal bedding (or the humans in contact with the animal bedding or animals) and/or the barn environment. Aspects of this feature include infusion of a proprietary compound, comprised of a mixture of environmentally safe (natural) elements, into the recycled animal bedding prior to redeployment of the recycled animal for reuse, creating a clean, safe virtually pathogen-free recycled animal bedding (with anti-viral, anti-bacterial anti-mold improved healthy properties). The present invention further provides methods for preventing or minimizing mold spores in animal bedding.

The present invention further provides for the redeployment or reuse of the "manure," properly classified as feces, urine or expectorant resulting from separating the wood shavings, and may include hair, hay, dust, fines from the original bedding properties and water.

The present invention further provides for the redeployment or reuse of manure, feces, urine or expectorant resulting from recycling animal bedding and the disposal of materials related to the recycling or repurposing of stall residual waste and/or soiled animal bedding which is environmentally conscious. In furtherance of this aspect of the invention, the method implements waste management, best practices, and biosecurity procedures which combine wood shavings and bedding materials recycling, water reclamation, and biomass byproducts to manage the total animal stall residual waste stream effectively.

Finally, the present invention provides for an inventive infusion apparatus "the infusion apparatus" to provide an improved quality of animal bedding wood shavings incorporating a bio-secure anti-viral plant extracts and oil compound which is made up of natural compounds and plant extracts, and provides benefits to animals, humans interacting with the animals, and the barn environment.

Without being bound to a particular embodiment or theory, and for the purposes on a non-limiting example, it should be appreciated that embodiments of the present invention may use or combine the teachings herein to optimize the reuse of equine stall residual waste, (wood shavings used for horse bedding) by a) performing one or more steps of the inventive process or use one or more of the inventive devices in a controlled environment; b) provide a continuous or single batch process to create healthier bulk shavings prior to, and after, infusion, c) implement an infusion process in-line or independently; d) use anti-bridging technology within the process and along with the devices to provide a continuous operation, reducing maintenance and break-downs; e) utilize a conveyor system that allows for a constant flow of bedding throughout the entire process implemented; f) integrate heat into drying to make it inert, and g) integrate heat into the apparatus to enhance the infusion process. It should be further appreciated that although portion of this description and examples refer to wood shavings and wood shaving used for horse bedding, as part of the animal bedding and stall residuals, the present invention may be used along with other materials used in animal bedding or the barn environment, including those materials known in the art. Thus nothing herein is intended to limit the animal bedding, or processes for recycling to wood shavings.

This summary is provided to introduce a selection of concepts in a simplified form that are further described below in the Detailed Description. The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (Figs.) are listed below.

FIG. 5A illustrates one embodiment of an infusion tank with a dialysis pump for providing infusion compound to the infusion tank. FIG. 5B-FIG. 5E provide various views of at least one embodiment of the infusion tank, illustrating A the tank, B the agitators or tumblers, C one or more misters, D one or more spray bars, E the pump outlet and supply to the infusion tank, and F one or more pumps for supplying the infusion compound to the infusion tank.

Figure 1:
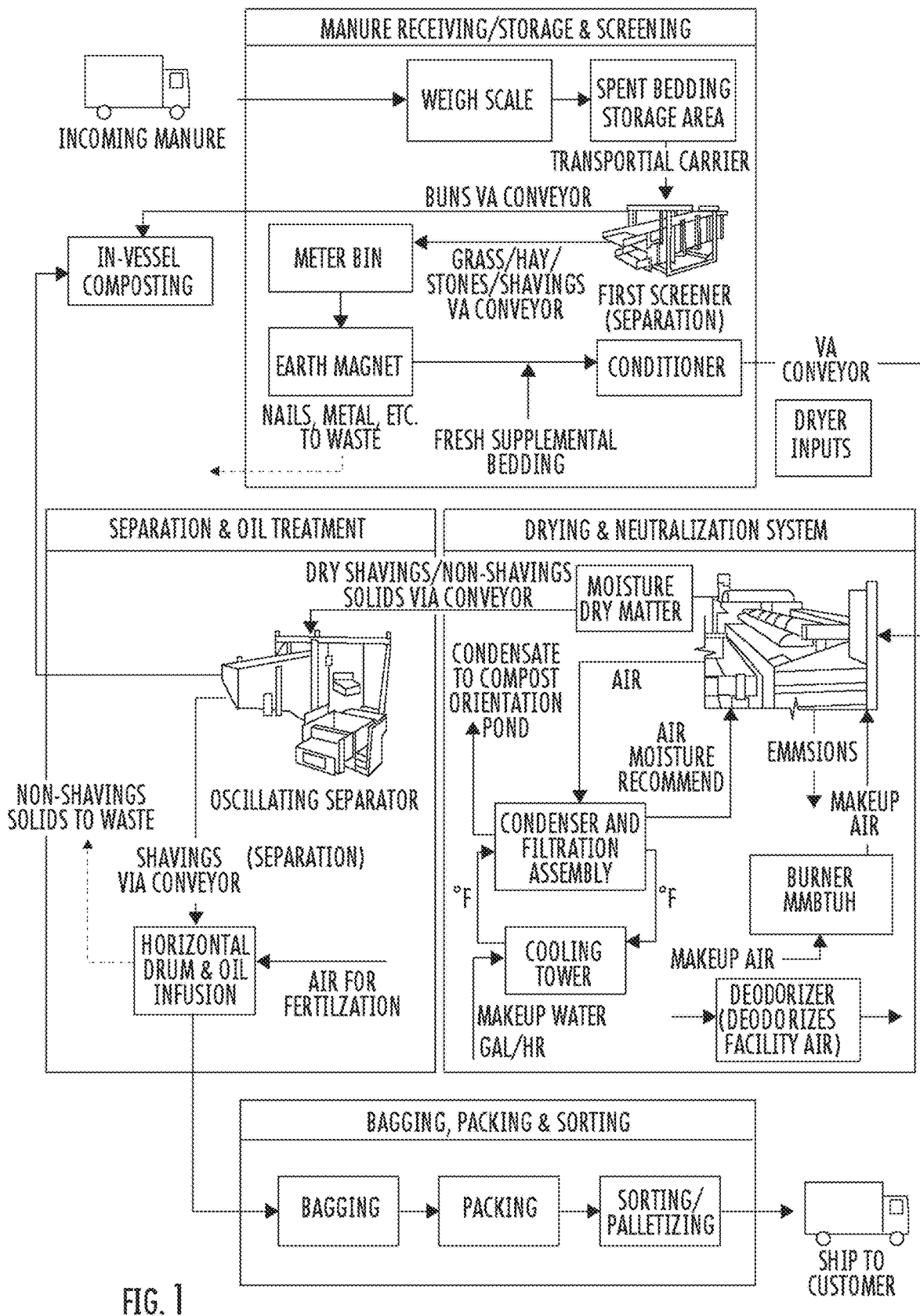
FIG. 1 illustrates at least one exemplary method of the inventive process.
Figure 2A:
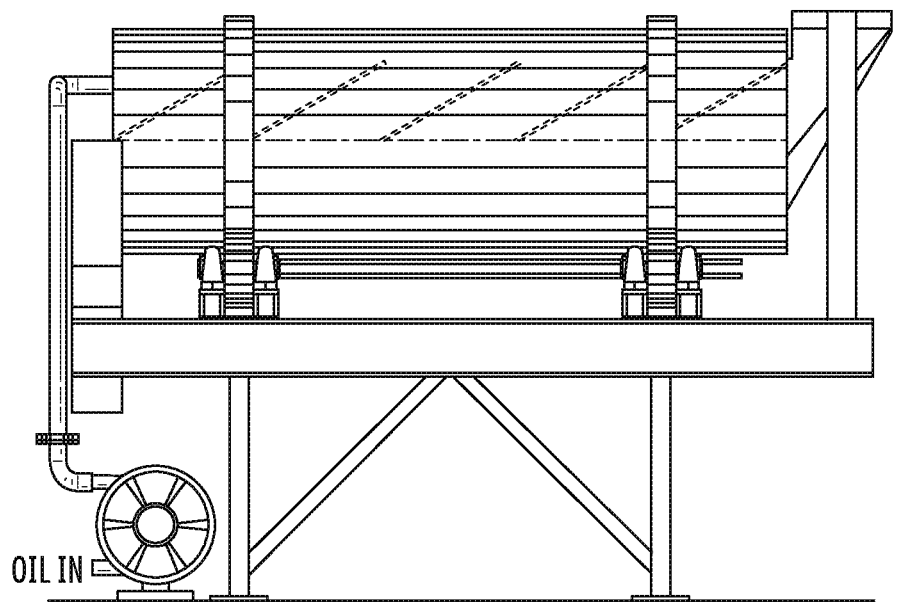
FIGS. 2A and 2B illustrate side views of different embodiments of an inventive infusion tank/device/system.
Figure 2B:
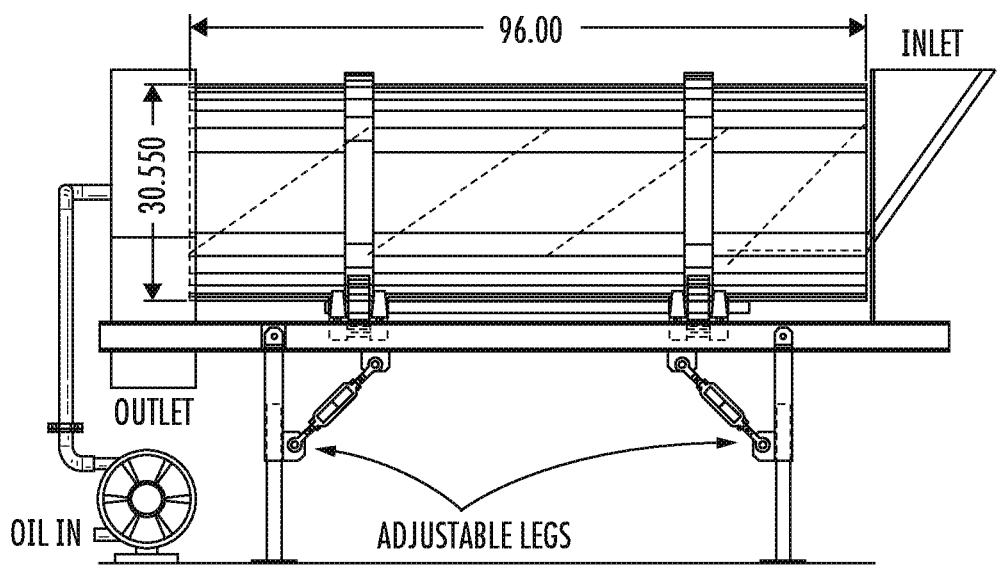
Figure 3:
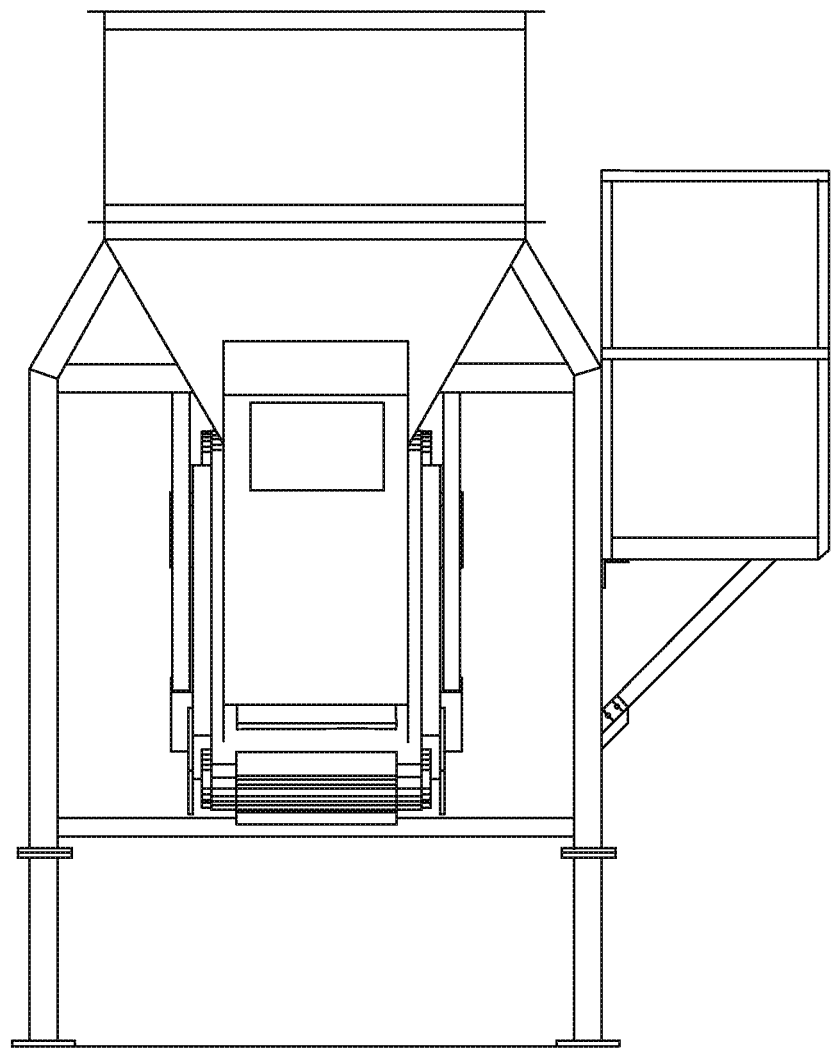
FIG. 3 illustrates a front view of at least one embodiment of a metering bin.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION

The present invention is directed to methods for recycling stall residual waste and/or soiled animal bedding to provide for a recycled animal bedding that is improved for the health of animals and humans and the barn environment. The present invention provides for the development, design-build and testing of an infusion apparatus to perfect the delivery mechanism of the whole system to create a healthier bedding used inline or can be manufactured separately for existing onsite farms to make bulk animal bedding healthier while creating a better breathing environment for animals and humans when filled in the barn. When used as part of the whole system, stall residuals are separated creating hypoallergenic virtually dust free recycled shavings for animal bedding. Thus, when used, the present invention, among other things, creates a bedding which is cleaner and healthier than the original to improve the equestrian lifestyle.

In at least one embodiment, an exemplary process includes one or more systems devices or apparatus, which when connected for the purposes described herein: a) creates a uniform volumetric feed system wherein the issue of chronic material bridging is addressed; b) creates a low agitation conveyance system to move material from feed system to the infusion system; c) creates an infusion device capable of gently folding bedding material over itself while moving it through a flow of atomized anti-microbial fluid, reducing the viscosity of the fluid to a point where it will atomize under pressure and reduced orifice sizing as well as enhance absorption into the bedding material, providing a monitoring system capable of measuring the moisture content pre and post infusion process, and provide automated controls complete with data acquisition for QC purposes; d) creating a non-bridging storage system for pre-packaging inventory.

In some embodiments, monitoring technology is used. In such embodiments monitoring technology includes traceability software to track waste location. In some embodiment, monitoring further includes tracking safety and privacy protocols. Tracking is intended for capturing all big and small data from each component including flowrate and heat and moisture to accurately track bio security protocols for recycled bedding. Furthermore, in some embodiments, tracking is intended to make over-the-air adjustments from a central location to optimize flow on all sites. Embodiments further include automation of an entire facility using existing communications interfaces from manufactures to a single user interface for local use to track system faults, required maintenance, or necessary repairs. Embodiments include global use to develop data to create emission and energy efficiencies to all plants and feed data back to the Facility.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

As used herein soiled animal bedding means wood shavings or other bedding material used in the barn environment, berthing areas or stalls (including, without limit, natural wood fiber, sawdust, shell materials, hemp, straw, rope, cloth, fibers, extruded polymer yarns, or other bedding material) which have been commingled with manure, water, fecal matter, hay, urine, grass (organics), expectorant, and other contaminants or pathogens. Soiled animal bedding may be referred to herein alternatively as stall waste stream, stall residual waste, stall residuals, used bedding, manure or waste bedding.

As used herein moisture refers to any material in a liquid phase immixed or absorbed by the soiled animal bedding, wood shavings, or other bedding material. Without limiting the foregoing, moisture includes, without limit, water or urea.

As used herein manure refers to animal waste including without limit fecal matter, urine, fines, dust, and which is immixed with undigested hay, grass, and other organic materials.

As used herein wood shavings means straw, hay, grass, wood chips, hemp, straw, wood shavings, wood chips, hemp, peat moss, corn husks, peanut hulls, paper bedding, cubed paper bedding, or other natural fibers derived from trees, plants, or their roots, leaves or flowers.

As used herein stall residuals means any materials removed from a stall which may include wood shavings, food, urine, fecal matter and other materials taken from a stall and discarded.

As used herein, Biomass means the byproduct of separating manure fecal buns also known as road apples to make compost, soil, fertilizer, fuel, digestate.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Generally

The present invention provides for method of recycling spent wood shavings present in stall residual waste and/or soiled animal bedding and stall residuals. Certain embodiments provide for the recycling of the whole waste stream present in the soiled animal bedding.

While generally stall residual waste and/or soiled animal bedding may be received from any source of stall residual waste and/or soiled animal bedding, certain embodiments include receiving stall residual waste and/or soiled animal bedding from local barns through official haulers in covered trucks to a facility, and in some embodiments a bio-secure facility, for performing the inventive process.

The inventive method includes at least receiving stall residual waste and/or soiled animal bedding from one or more animal stall or berthing locations, mixing and separating the stall residual waste and/or soiled animal bedding resulting in separated wood shavings and bedding materials, reclamation of moisture from the separated wood shavings and bedding materials, pasteurization or sterilization of the separated wood shavings and bedding materials, separating again to remove organic fines and dust, and infusing the separated wood shavings and bedding materials with one or more compounds.

Certain embodiments include an inventive infusion apparatus which infuses the wood shavings and bedding materials with one or more compounds. Where used, the infusion tank infuses dried recycled reusable wood shavings with one or more compounds. In some embodiments, the compound infused provides for properties of antiviral, antibacterial, antimicrobial, anti-odor, hypoallergenic, scented or combinations thereof.

Some embodiments further provide for preparing the separated manure buns, dust, and fines to be used as a biomass.

Certain embodiments include screen separation of the separated wood shavings and bedding materials by applying the separated wood shavings and bedding materials to one or more screens to separate the separated wood shavings and bedding materials by size. Further, certain embodiments include packaging the recycled wood shavings and bedding materials. In at least one embodiment, the inventive method further includes producing a biomass or organic matter from the separated manure and organic matter fines resulting from the recycled wood shavings and bedding materials for reuse and repurposing.

Generally, the inventive process includes a pre-separation of manure, fecal matter, plastics, oversized wood materials, metals, and other paraphernalia through a custom oscillating screen. The wet separated shavings are then metered for even drying to remove urea, water, pathogens, and bring moisture down. Custom oscillating screens remove the organic matter fines and dust out of reusable, recycled shavings. The shavings are then packaged to hold the compound infused shavings in a manageable sized bag for redistribution into berthing area/stalls.

Figure 6:
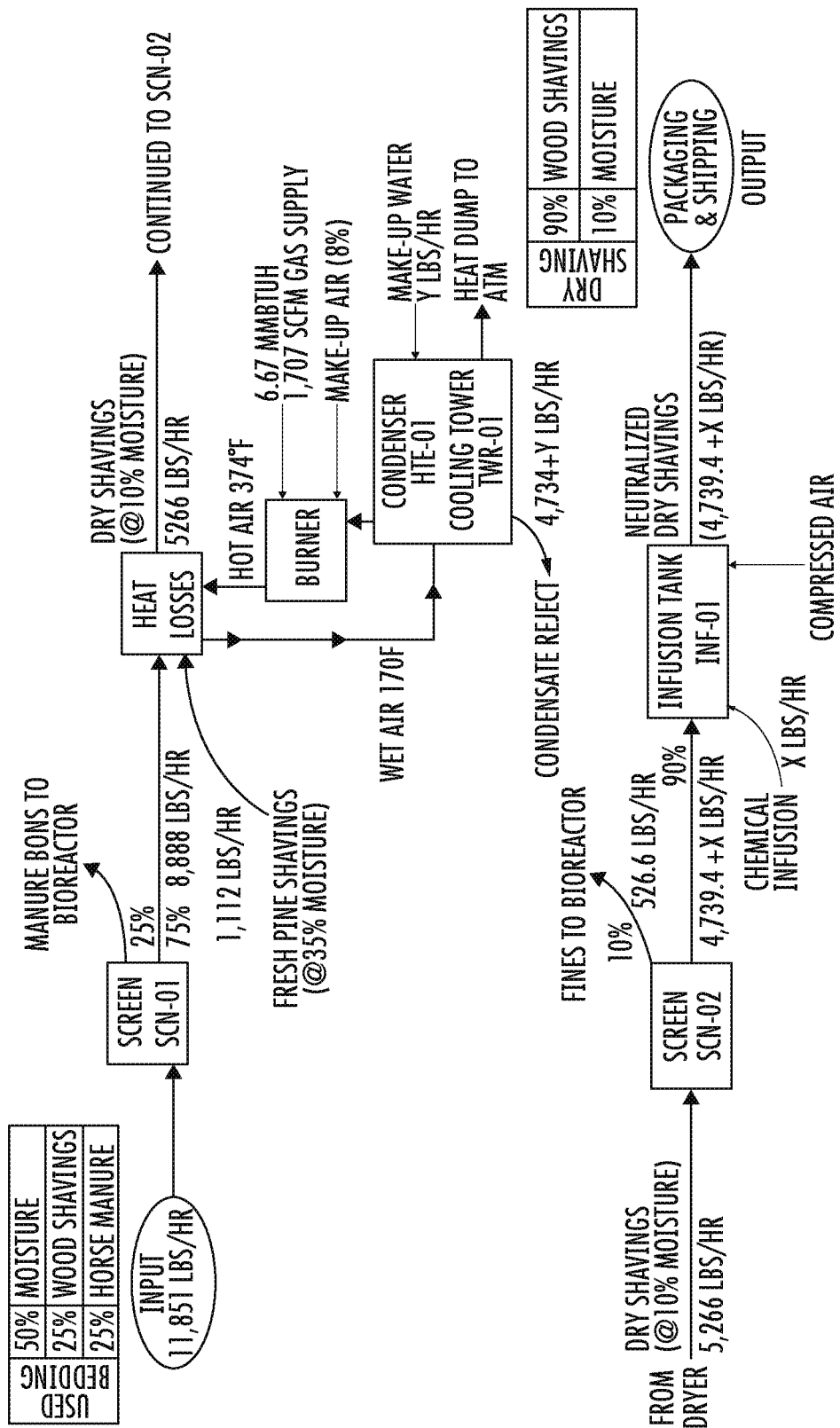
FIG. 6 illustrates at least one exemplary method of the inventive process.
Figure 7:
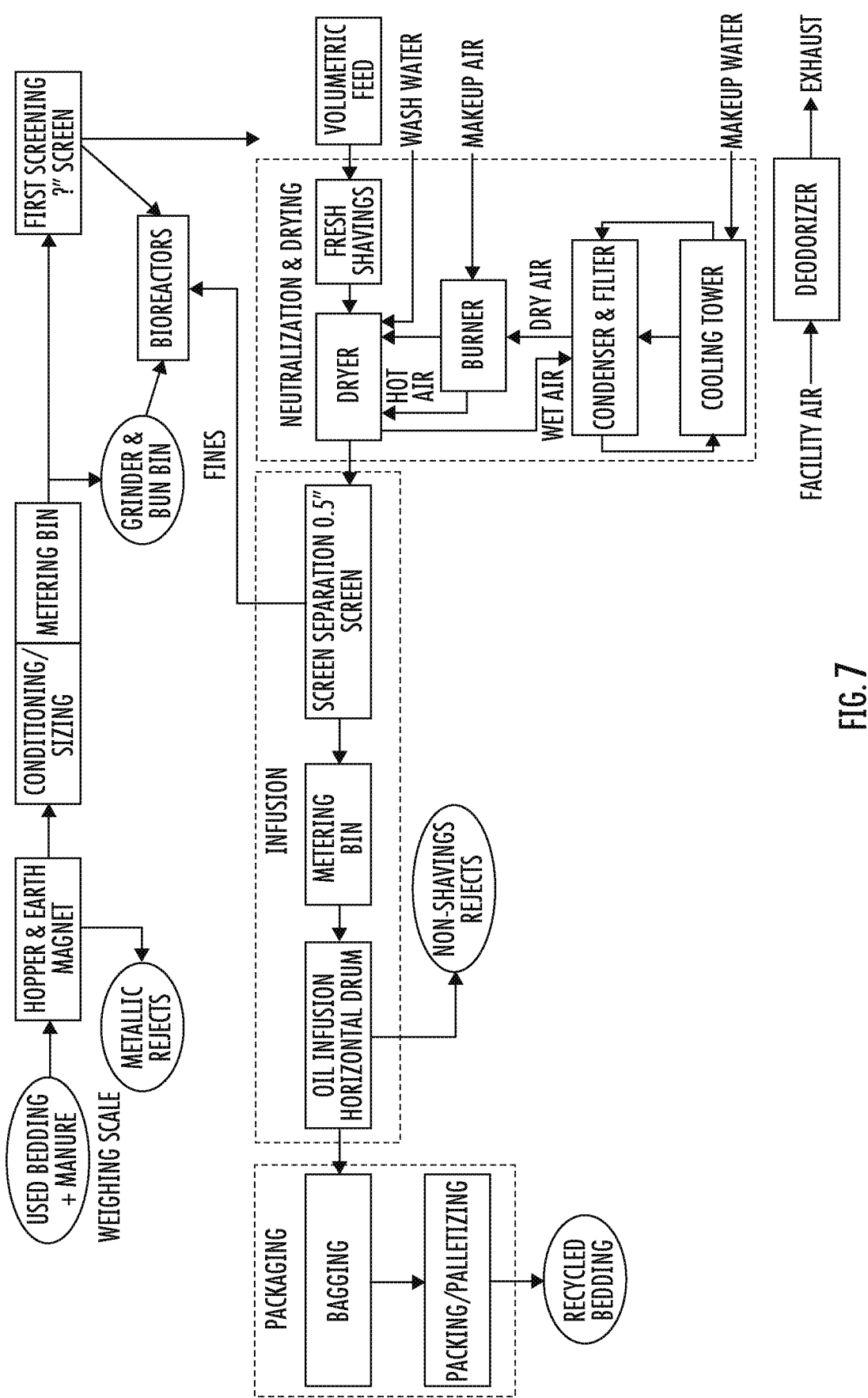
FIG. 7 illustrates at least one exemplary method of the inventive process.

FIG. 1, FIG. 6 and FIG. 7 include some of the many exemplary embodiments of the inventive process as described herein.

Sorting and Separating Step

Sorting and separating the stall residual waste and/or soiled animal bedding provides for measuring the moisture content of the stall residual waste and/or soiled animal bedding, separating metal materials from the stall residual waste and/or soiled animal bedding, and separating manure and non-metallic foreign materials from the stall residual waste and/or soiled animal bedding.

Upon receipt, the stall residual waste and/or soiled animal bedding and stall residuals enter the animal bedding reprocessing area or covered facility. The stall residual waste and/or soiled animal bedding may be dumped, metered or separated into separated sectioned areas of the building in piles with infrared scanners or metering equipment, to measure temperature and moisture in the pile for arcuate readings for mixing and safety in an enclosed building. In some embodiments, the stall residuals and/or soiled animal bedding is weighed by a scale, measured for moisture by use of a probe and or infrared scanners and stored. In at least one embodiment, the moisture content of the stall residuals and/or soiled animal bedding is preferably no more than 35% moisture prior to being recycled and reused. In at least one embodiment, if the stall residuals and/or soiled animal bedding received are more than 50% moisture content or 50% manure (by weight), the received stall residuals and/or soiled animal bedding is directed to a bioreactor to create organic matter.

In embodiments where the stall residuals and/or soiled animal bedding is stored, they are typically stored for under one week.

In at least one embodiment, new bulk shavings (generally having around 35% moisture content and some dust) are mixed with the stall residuals and/or soiled animal bedding prior to the recycling process to process the new wood shavings and animal bedding materials along with the stall residuals and/or soiled animal bedding. In embodiments where new bulk shavings are introduced to the stall residuals and/or soiled animal bedding, to replace the dust and fines broken down from past recycling cycles, add a lighter color to the overall bedding, and it optimizes the energy use since the new bulk shavings need to undergo the same processing steps in order to achieve similar benefits received from the recycled animal bedding process, Mixology of the stall residuals and/or soiled animal bedding and new shavings helps create a preferred moisture to shavings ratio for the process.

The received stall residuals and/or soiled animal bedding is mixed to specific parameters (by hand, using a loader, or other methods) to create a consistent level of product, then sent to one or more metering bins. In at least one embodiment, one or more methods of monitoring weight, moisture, fecal matter load, or combinations thereof is employed along with the mixing step. Without being bound to any particular theory, it is well known that moist materials in hoppers tend to clump together and form arches that eventually support the weight of the materials (also referred to as bridging) and thus prevent the metering or flow of materials. Thus in at least one embodiment a uniform volumetric feed system is used (a flow rate monitored metering bin) wherein the issue of chronic material bridging is addressed. In at least one embodiment, the one or more metering bin has a cone-shaped entrance to handle stall residuals and force product down towards the opening that is monitored to consistent flow rate. In at least one embodiment, this is accomplished by an anti-bridging rod which is controlled by an electronic eye on the discharge shoot of the metering bin. It should be appreciated that other methods may be employed that are known in the art to control the anti-bridging rod. The moment the flow changes the bridging arm raises to make sure bridging has not occurred, turns the materials in the metering bin, and allows the flow to be consistent.

It should be appreciated that certain metallic objects and non-metallic objects (such as plastics) are routinely used and inadvertently discarded in animal stalls. Thus, stall residuals and/or soiled animal bedding typically includes, along with manure and wood shavings, some amount of metals and other non-metallic items that are not intended to be included in the recycled animal bedding. In some embodiments, the metering bin has one or more magnets (including, without limit, rare earth magnets or electro-magnets) to separate magnetic metallic items, including, without limit, nails, shoes, or other metal fragments. In at least one embodiment, one or more preceding of subsequent conveyors to the metering bin further include one or more magnets.

In at least one embodiment, the stall residuals and/or soiled animal bedding is distributed on a conveyor from the metering bin. In at least one embodiment, the metering bin flays the shavings across a wide area for a better spread for drying. In at least one embodiment, oscillation of the conveyor allows for gentle separation of wood shavings, large manure buns and unusable paraphernalia. In at least one embodiment, the conveyor has a patterned grip to ensure the protection of the fibers from breaking down which allows for gentle separation of wood shavings, large manure buns and unusable paraphernalia.

In at least one embodiment, separation of the wood shavings, large manure buns and unusable paraphernalia allows for the separation into three diversion points. In such embodiments, product over 1.3" to 1.7" wide or round are moved to one entrance and transported by conveyor where paraphernalia such as needles bottles and other non-magnetic items are removed and placed into a crusher to be compacted and recycled. This can be done by hand or by electronic eye looking for shape and item. The manure buns are left on conveyor to be transported to the bioreactor to be turned into biomass. The shavings under the maximum allowance drop through the oscillating screen and passed to a second conveyor to dry.

Once separated, the separated wood shavings and animal bedding are transported to a dryer. While it is preferred to have no manure or other foreign metallic and non-metallic materials in the separated wood shavings and animal bedding, it is virtually impossible to control the size of these unwanted items, thus it is appreciated that some amount of manure as well as foreign metallic and non-metallic objects may be intermingled with the separated wood shavings and animal bedding. In at least one embodiment, as the separated wood shavings and animal bedding move toward the dryer, a magnetic tube (using earth magnets or electro-magnets) is used to separate any residual metals immixed with the separated wood shavings and animal bedding.

Moisture Reclamation Step

Upon separation of the wood shavings and animal bedding from the stall residuals and/or soiled animal bedding, the separated wood shavings and animal bedding are sent to a dryer. In some embodiments, the dryer is configured to allow for the recapture of the moisture being separated from the separated wood shavings and animal bedding for moisture recycling and reuse. In at least one embodiment, before the dryer, a metering bin is used to eliminate any fluctuations in flow of material to the dryer. In such embodiments, it is preferred that the metering bins use a metering gate with sensor and anti-bridging technology. In some embodiments, to maximize efficiency of the dryer, a widespread arm is used to allow for even spread of the separated wood shavings and animal bedding to the dryer. In some embodiments, to maximize efficiency of the dryer, a rotating knife(s) in the metering bin breaks down any clumps for even spread of the separated woods shavings and animal bedding to the dryer.

In embodiments that allow for moisture reclamation, the heaters in the dryer heat the separated wood shavings and animal bedding sufficient for the moisture in the separated wood shavings and animal bedding to turn to condensate (steam). In some embodiments, the steam is directed through an additional mechanical or reverse osmosis filter, or UV light or titanium membranes then condensed and directed to storage tanks. The reclaimed moisture may be used for any purpose including, without limit, cleaning, irrigation, and drainage. In some embodiments a portion of the reclaimed moisture is used in the biomass process. In some embodiments, the moisture, including water and urine, is turned to a steam and later condensed back to water for later use.

In at least one embodiment the condensate and moisture go through filters to create a continued nitrogen, phosphorus, and potassium (NPK) rich product for agriculture spreading, or irrigation.

In at least one embodiment, the condensate and moisture go through filters to create a continued NPK rich product to the bioreactor to add to the manure and dust and fines to make better biomass or organic matter.

In at least one embodiment, the condensate and moisture go through further filtering to create greywater for drainage or cleaning of material driveways or roads.

In another embodiment, the condensate and moisture go through further filtering with reverse osmosis and/or ultraviolet light and or titanium membrane filtration to create potable drinking water.

Many methods may be employed for the removal of moisture as described herein. In some embodiments, a dryer may be used which employs natural gas heat, indirect heat with no emissions, using biomass as a fuel source in a biomass burner or boiler, thermodynamic drying, infrared drying, or combinations thereof.

Pasteurization or Sterilization Step

Pasteurization or sterilization of the separated wood shavings and animal bedding is important for the recycling and reuse of the separated wood shavings and animal bedding in order to promote the health and safety of the animals and humans handling the recycled separated wood shavings and animal bedding or working with the animals or exposed to the barn environment. In at least one embodiment, the drying system uses a temperature sufficient to remove most of the ammonia, pathogens mold, yeast, urea, and additional moisture. In embodiments where it is desired to reduce the amount of discharge from the drying system to the environment, the dryer utilizes a closed-loop recirculating air stream and potential emissions from the dryer are fugitive and contained.

In at least one embodiment, the separated wood shavings and animal bedding exit the dryer at least a temperature range of 190° C.-215° C. This is important, as it is known in the art that maintaining items at temperatures of at least a temperature range of 190° C.-215° C. for at least 3 minutes to 9 minutes is known to kill, among other pathogens, bacteria, mold, and *E. coli* found in animal manure stall residuals. Where implemented, this step assists in keeping the recycled wood shavings from contamination or atmospheric dust and mold spores.

Other pasteurization or sterilization methods may be employed individually or complimentary to heat pasteurization or sterilization. In at least one embodiment, a nonthermal plasma technology is introduced to further pasteurize or sterilize and deodorize. In other embodiments, the separated wood shavings and animal bedding is exposed to ozone. In another embodiment natural brighteners and deodorizes like sodium bicarbonate and borax is introduced pre or post drying to further clean and deodorize.

Screen Separation Step

In some embodiments, further separation is implemented to produce a particular product for one or more specific uses, or to further reduce the amount or organic waste that may be repurposed, or to assist in the further reduction of dust. In at least one embodiment, the inventive process includes use of one or more separation screens sized for the separation of organic matter fines from the (dried and pasteurize or sterilized) separated wood shavings and bedding materials. Preferably such screens are sized sufficient to retain the separated wood shavings while allowing organic matter fines (or other small material such as dust) to be separated from the wood shavings and animal bedding.

In some embodiments, the recycled wood shavings and animal bedding may further be screened to provide a particular product. It is appreciated that different animal breeds (equine, swine, bovine, avian, chicken, duck, to name a few), or breeders therefor, may prefer a smaller or a larger wood shaving for animal bedding rather than a ubiquitous mixture. In such embodiments, screen separation is applied to the separated wood shavings and bedding materials with the screen size selected based on the preference of the wood shaving size.

Infusing Step

Upon drying, or optionally drying then separating, preferred embodiments of the present invention infuse the separated wood shavings and bedding materials with one or more compounds having antiviral properties, antibacterial properties, antifungal properties, anti-mold properties, anti-odor properties or combinations thereof. The infusion of antiviral, antibacterial, antifungal, or anti-mold properties makes for the bedding to be safer for the animals and humans than non-recycled bedding. Without being bound to a particular theory, evidence suggests that use of such infused bedding assists with healing animals suffering from hoof rot, cuts, or wounds, and assists for improved or healthier breathing across the barn and acts as a deterrent to pests and bugs.

In at least one embodiment, upon the separated wood shavings and bedding materials exiting the dryer, the dried wood shavings and bedding materials are diverted to a metering bin (similar to those disclosed herein). In some embodiments, the conveyor to the metering bin or the metering bin itself, are continually heated to assist in the continued pasteurization or sterilization of the materials. Where used, the metering bin for the dried wood shavings and bedding materials is used to optimize flow of the materials to the infusion tank.

In at least one embodiment, a covered heated and insulated conveyor coming from the dryer to the separator and from the infusion tank exit to the bagger is used.

Infusion Tank Apparatus

The present invention provides for one or more infusion tanks, devices or apparatus for infusing one or more compounds. Such infusion tanks, devices or apparatus are intended to provide an improved quality of animal bedding wood shavings incorporating a bio-secure/biosafe anti-viral natural compound made from plant extract for the quality of wood shavings and benefits to animal, and humans with interactions with the animals and barn environment. Where used, it is intended that the infusion tanks, devices or apparatus perfects the delivery mechanism of the whole system to create a healthier bedding used inline or can be manufactured separately for existing onsite farms to make bulk animal bedding healthier while creating a healthier or improved breathing environment for animals and humans when filled in the barn. In embodiments that such infusion tanks, devices or apparatus are employed, it is believed when used as part of the whole system, stall residuals are separated creating hypoallergenic virtually dust free recycled shavings for animal bedding, thus creating a cleaner and healthier bedding material than the original to improve the equestrian lifestyle, and the welfare of other animals lifestyle. In addition it is believed that such use of infusion tanks, devices or apparati benefits the barn environment and surrounding area with potential savings as bulk bedding can continue to be used rather than going over to bagged bedding.

It is also appreciated that the most common vectors for spreading diseases such as equine infectious anemia, is through biting flies, or tabanids, particularly horseflies. These large blood feeders can carry virus-bearing blood on their mouthparts from an infected animal to others. Thus embodiments include compounds which, through the use of one or more embodiments of an infusion apparatus, are infused into the recycled wood shavings by reducing biting flies, actively or passively, thus improving the health of the animals and those exposed to the barn environment.

The infusion process will address an issue in this sector and ease demands from workers to have better working conditions in barns. From a racing and show sector, it allows the animals to have healthier bedding to give better results to their owners. Thus overall, the infusion step will improve animal health, air quality for barn management and the surrounding area.

It is appreciated that one of many infusion tanks may be used in the inventive process described herein. In at least one embodiment, an infusion tank is implemented to function as a continuous-flow operation, rather than a batch process. In such embodiments, a uniform volumetric feed system is preferred. In at least one embodiment, a low agitation conveyance system is used to move material from the feed system (from the dryer and optional separator and optional metering bin) to the infusion system. In at least one embodiment a covered sealed hood conveyor is used for transporting the wood shavings to the infusion tank to keep heat in. In at least one embodiment a covered sealed hood conveyor is used for transporting the wood shavings from the infusion tank to help keep the infusion aroma and compound fused into the bedding. In at least one embodiment, the foregoing occurs from the infusion tank to one or more bagging apparatus.

In some embodiments, the infused wood shaving and animal bedding is deposited to a wheelbarrow to be immediately deployed to an animal stall. In other embodiments the infused wood shaving and animal bedding is conveyed for bagging or packaging.

In at least one embodiment, the infusion tank/device provides for gently folding bedding material over itself while moving it through a flow of atomized fluid, reducing the viscosity of the fluid to a point where it will atomize under pressure. Some embodiments of the tank include reduced orifice sizing to enhance absorption of the fluids into the bedding material. In certain embodiments, a monitoring system is implemented with the infusion tank/device/system which is capable of measuring the moisture content pre and post-infusion process. It is further appreciated that some embodiments of the infusion tank/device/system may implement automated controls complete with data acquisition for QC purposes.

In at least one embodiment, the infusion tank, device or apparati will only increase wood shaving moisture by under 3%.

It should be appreciated that atomization of the treatment fluid and subsequent absorption of such liquid, all within isolated containment, is critical for the effectiveness of the treatment fluid.

In at least one embodiment, the infusion tank/device/system implements a metering bin to provide for constant flow of material into the infusion tank based on weight using load cells. Where used, the load cells on the tank measure the weight of compound and water. Where used, the load cells on the tank metering bin measure the weight of compound and water. These cells work by confirming that the right compound to moisture ratio is achieved before activating the pump, measuring the amount of compound being used per square foot to validate an even flow across the bedding.

A variable frequency drive (VFD) reduces the turning speed of the infusion tank to stir the mixture to optimizing the curtaining effect and mixing of the compound into the bedding material. The mixture, based on the requirement of the velocity of the mix and the working of the pump, is to drive a constant flow of constant mix to a constant amount of bedding. Custom and carefully defined and placed steel slated arms within the tank act as paddles inside the infusion apparatus are used to move the material from top infeed to bottom outflow of the tank. A flow bar arm and nozzles micro-mist the bedding accurately to the desired flow per Sq. Foot. Atomization of the treatment fluid compound and subsequent absorption of the liquid are all within an isolated containment. The use of such an infusion tank/device/system provides for disease control through sanitized animal bedding.

It is intended that with some embodiments of the present invention that an infusion device capable of: a) gently folding bedding material over itself while moving it through a flow of atomized anti-microbial fluid; b) reducing the viscosity of the fluid to a point where it will atomize under pressure, and reduced orifice sizing as well as enhance absorption into the bedding material; c) create a monitoring system capable of measuring the moisture content pre and post-infusion process; d) provide automated controls complete with data acquisition for QC purposes. e) create a non-bridging storage system for pre-packaging inventory; f) incorporation of a metering bin which provides a release mechanism for constant flow into the infusion tank based on weight using load cells, or combinations thereof.

In at least one embodiment, the wood shaving are kept warm after the moisture separation and/or sterilization steps to allow for better penetration of the infusing compound applied to the wood shavings. In at least one embodiment the infusing compound is preheated prior to being applied. It should be appreciated that through recycling all of the received constituents of the soiled animal bedding and/or stall residuals that heat from water reclamation or thermo-dynamic heating (or other heating methods) is used, and thus exhaust, insulation or heat exchangers maybe used in assisting to keep the wood shavings warm to improve compound infusion.

One skilled in the art should recognize that many benefits may be possible through the use of an infusion step of recycled animal bedding. Depending on the one or more compounds used, and the infusion method employed, the infusion process may: a) allow barns to become more sanitary with fewer bugs, critters, & flies (potentially reducing the negative impact of AEI and West Nile); b) benefiting society in a progressive healthier barn environment; c) reducing inadequate disposal of stall residuals by reuse; d) reducing leaching of bedding left to rot on fields; e) reduces ammonia (note: drying also reduces ammonia); f) reduces methane off-gassing (note: drying also reduces methane off-gassing); and g) fewer particulates in the air that are antiviral.

In at least one embodiment, the infusion device is used in line with processed described herein. In other embodiments the infusion device may be used as a separate process from the recycling process to provide for anti-bacterial infusion to bulk bedding at a farm site where bulk bedding is transported through the infusion device and wheelbarrowed directly into the stall.

Notwithstanding, it should be appreciated that in at least one embodiment, the use of infusion tank may be substituted or omitted. It should be further appreciated that application of compound and plant extracts and/or oils and other enhancements may be applied through various methods known in the art, including, without limit, soaking and spraying.

In at least one embodiment, one or more base compound is added to one embodiment of the infusion tank in addition to 16 liters of water. The water and base compound is monitored while being mixed. The mixing process is performed until the mixture is suitable for its preferred use. In at least one embodiment, the water and base compound is mixed for 5 minutes. In at least one embodiment, the water and base compound is mixed and heated until the mixture is heated to a suitable temperature, between 80-160 degrees Fahrenheit, and ready to be pushed up out of the holding tank. In at least one embodiment, a dialysis pump is used for pumping the mixed compounds from the holding tank and distributing the mixture along one or more spray bar having, or connected to one or more misting heads. In at least one embodiment, a diaphragm or dialysis pump is used for pumping the mixed compounds from the holding tank and distributing the mixture along one or more spray bar having, or connected to one or more misting heads It is appreciated that misting speed may be selected based on the particular application, type of bedding being reprocessed, potential use of recycled animal bedding, or materials contained in the animal bedding. In at least one embodiment, the misting heads distribute the mixed compounds at a specific speed covering user defined distances in user preferred times through at least one infusion apparatus, which in such embodiments, dispenses a user preferred volume of the compound onto the bedding.

Figure 4:
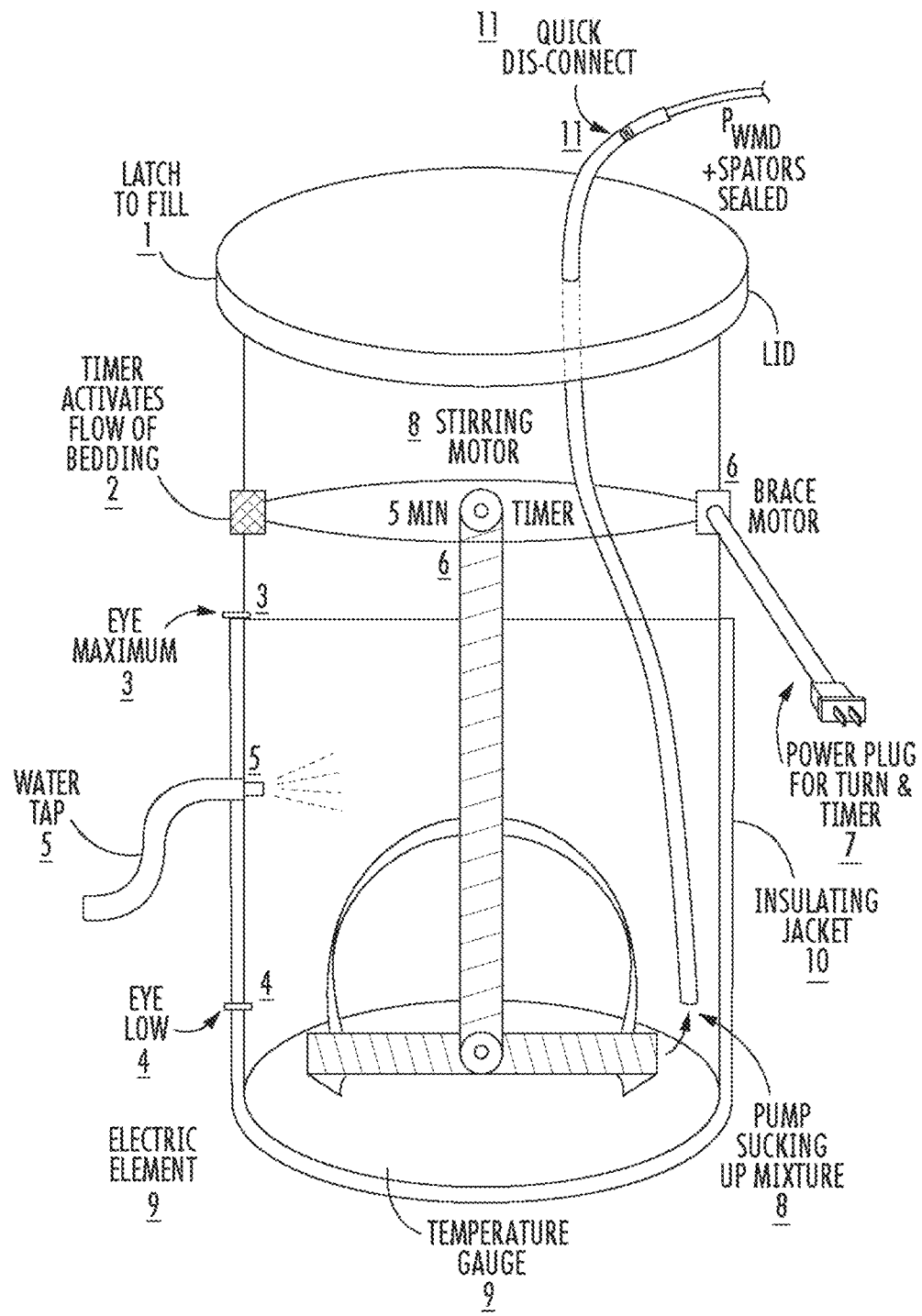
FIG. 4 illustrates at least one embodiment of a holding tank.
Figure 5A:
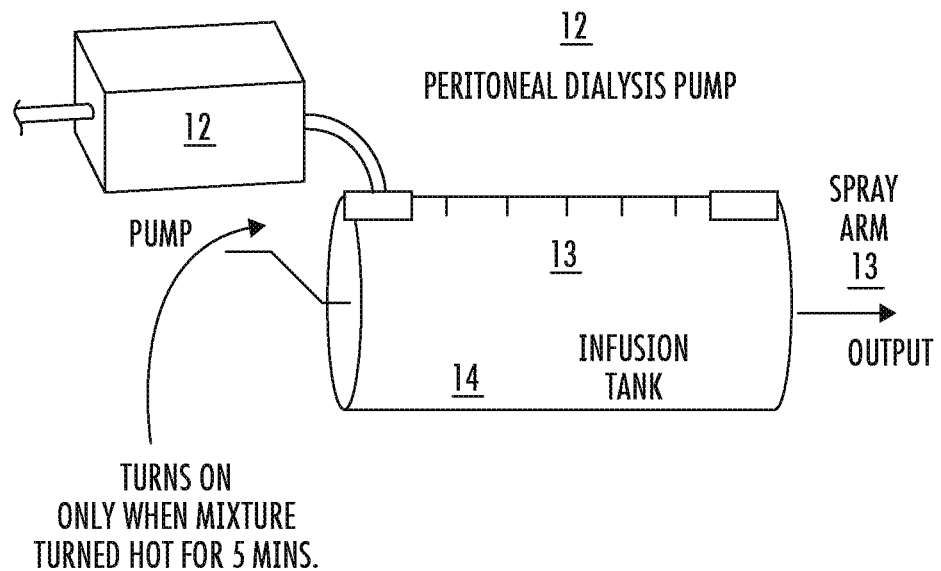
FIGS. 5A-5D illustrate various embodiments and views of an inventive infusion tank.
Figure 5B:
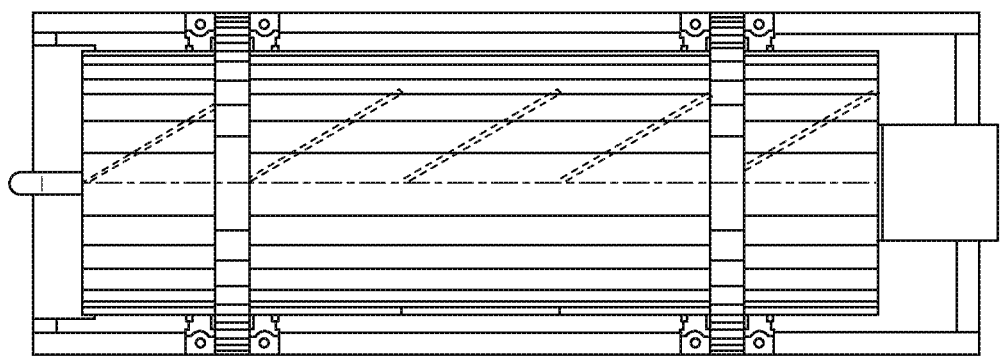
Figure 5C:
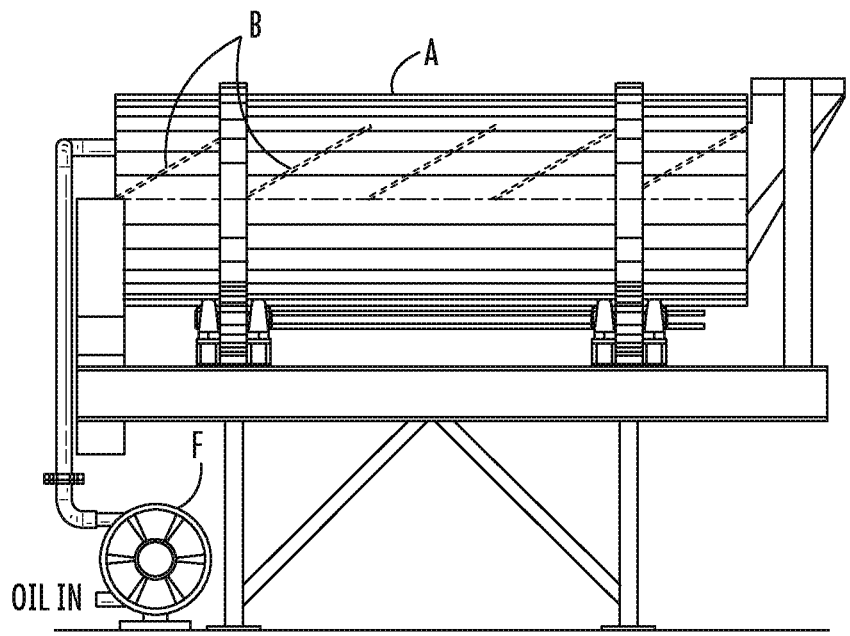
Figure 5D:
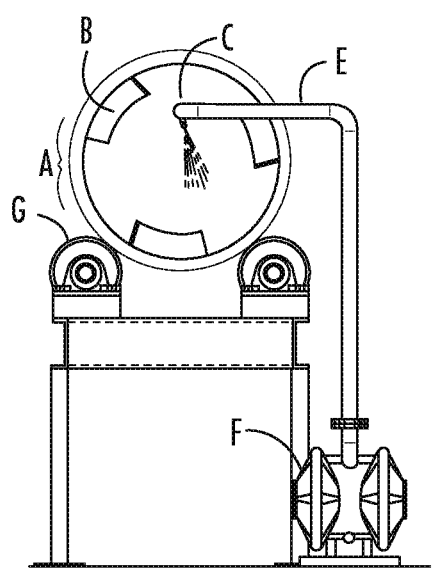
Figure 5E:
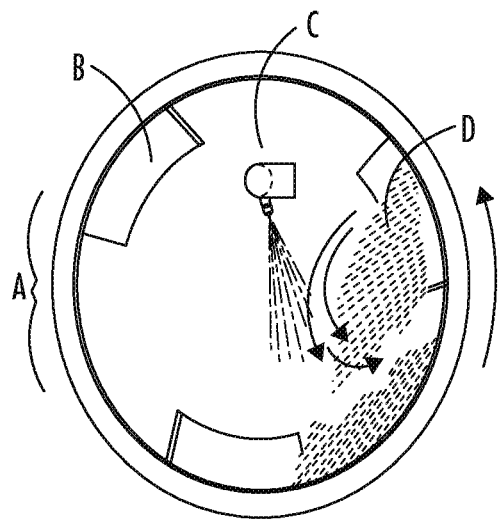

At least one example of a suitable holding tank is provided in FIG. 4. At least one embodiment of a pump being used in conjunction with an infusion tank is provided in FIG. 5A. As illustrated in FIG. 4 and FIG. 5A:

Feature 1: of one embodiment of the method the lid is unlatched and removed from the holding tank;

Feature 2: a digital or manual timer is used for timing the mixing process; Feature 3: an electronic eye is used to shut the water off at 20 Liters;

Feature 4: the electronic eye shuts down the system and batch while being refilled;

Feature 5: the hose from water mains into the machine in two goes one to 10 Liters and stir, then add 6 liters to the maximum and stir;

Feature 6: a heavy-duty motor is used to turn a ladel with an arm brace and plug to electrical supply;

Feature 7: a standard power plug provides electrical power to run the motor and electronics within the holding tank design;

Feature 8: a hose chosen from materials that won't disintegrate in solution up through holding tank-out of lid with quick connect to disconnect when refilling;

Feature 9: at least one electrical element around the bottom of the holding tank to heat mixture and water in an insulation jacket, with temperature gauge;

Feature 10: at least one insulation jacket to keep electricity load on electrical element low (In at least one embodiment, a hot water jacket may alternatively be used);

Feature 11: a quick disconnect from the pump to the lid. The quick connect is to disconnect when refilling/stopping any unwanted clumps or non-mixed liquid going to peritoneal pump or jets. Plus, easy clean and lid removal;

Feature 12: one or more peritoneal dialysis pump;

Feature 13: one or more spray arm having one or more jets;

Feature 14: at least one infusion tank (with or without its own hot water electrical element heating element around it) only allows bedding into the chamber when the mixture is turned hot and is running into peritoneal dialysis unit;

Feature 15: Metering bin input;

Feature 16. Bedding output leaves to a closed lid conveyor to the bedding mechanism.

Bagging Packaging Step

It is appreciated that in order to distribute the recycled animal bedding efficiently, that packaging or bagging the recycled wood shavings and bedding materials is desired. It is appreciated that many packaging or bagging systems are known in the art and nothing herein is intended to limit the bagging or packaging systems which may be implemented as part of the inventive process. It is preferred that the cleaned dried and infused bedding is bagged using a fully automated system which seals, wraps and stores the recycled material to provide a safe, fast, and efficient operation. In at least one embodiment a 1-ton sack or large sack with infused bedding can be sealed and used as an alternative to bulk.

Biomass Production

The inventive method includes steps or processes for separating manure and/or organic matter fines, as well as other material from the recycled animal bedding. In at least one embodiment, the manure and/or organic matter fines, as well as other material from the recycled animal bedding is directed to a bioreactor for producing a biomass. In at least one embodiment, the manure buns and organic matter fines are processed in a covered bioreactor to become inert and cured to be used as a biofuel, or digestate for energy and gas production in anaerobic digesters or an organic matter soil amendment. This is beneficial because unlike most composting operations that can take a year to breakdown wood shavings, use of such bioreactor allows for production of the biomass in as little as 3 to 7 days, saving time. In at least one embodiment, the manure buns, as well as other separated materials such as sticks and organic fines are combined with some amount of the reclaimed moisture produced from the inventive method. In some embodiments, other amendments are added to the bioreactor, including, without limit, fruit and vegetable skins and rinds or coffee grinds to adjust the PH balance. In some embodiments organic carbon is added. In some embodiment's enzymes are added. In some embodiments a controlled NPK mix is added to the curing organic matter after bioreactor.

In some embodiments, the biomass compound from manure can be sent to an anaerobic digestor as methane-producing manure biomass for the production of biogas. In certain embodiment, the manure buns, dust, and fines are transported directly to an anaerobic digestor. While in other embodiments, the manure buns, dust, and fines are composted using windrows, oxygen or other composting techniques.

It is appreciated that the biomass production steps may yield one or multiple products for reuse, such as: a) a nutrient rich soil amendment; b) a nutrient balanced organic matter fertilizer c) fuel pellets; d) absorption pellets for oil spills; e) biomass logs for burning in fires, or kilns; f) a high BTU pellet that can be used in concrete plants as the higher urea content is a cost-saving; g) soil amendment for gardens; h) an organic matter fertilizer for ag lands, landscaping and other uses; i) a filler for other composts; or j) combinations thereof.

Infusing Compounds

It is appreciated that many compounds exist which have antiviral properties, antibacterial properties, antifungal properties, anti-mold properties, anti-odor properties, or combinations thereof. Nothing herein is intended to limit the available compounds to provide the aforementioned benefits. In at least one embodiment, a compound for infusing with the recycled animal bedding is used which includes an amount of one or more of coconut oil, acetyl alcohol, stearic acid, fractionated coconut oil, lecithin, water, borax, or combinations thereof. It is appreciated that other oils having similar properties as coconut oil, such as, and without limitation, palm oil, may be substituted or added in combination with the coconut oil.

In at least one embodiment, a compound comprises of a base compound and a treatment compound. It is intended that the base compound would be used in several compounds, and that based on the particular purpose or use of the recycled bedding, that the treatment compound would differ. In some embodiments, the base compound further assists with infusion of elements of the treatment compound, as one or more of the elements may not have good infusion properties by itself.

In at least one embodiment, plant extracts used along with the compound include extracts from one or more of yarrow tree, canadian spruce, black spruce, canadian balsam, doug fir, silver fir, cassia, litsea, manuka, peppermint USA, copaiba, benzoin or combinations thereof.

Inventive compounds, as taught herein, may be made and infused locally, or may be made remotely, bottled, and transported to a point of use. In some embodiments, the inventive compounds may further be used directly as an over the counter pain and protection topical or therapeutic for animals, and humans.

Various elements are available which have proven beneficial attributes. Nothing herein is intended to limit the constituents which may be implemented in an infusion compound.

Black Spruce is one element which may be used in a compound, which is known for use in treatment of respiratory problems, insect repelling, wound healing, muscle & joint problems Canadian Balsam is one element which may be used in a compound, which is known for use in treatment respiratory, wound healing, muscle & joint issues, and colic.

Silver fir is one element which may be used in a compound, which is known for use in treatment antibacterial, fungicide, pesticide, anti-viral, laxative. Expectorant, and anti-inflammatory properties.

Cassia is one element which may be used in a compound, which is known for use in treatment anti-fungal, anti-bacterial, countering mold, and assist in digestion.

Litsea is one element which may be used in a compound, which is known for use in treatment antibacterial, antiseptic, anti-viral, and anti-inflammatory properties.

Manuka is one element which may be used in a compound, which is known for use in treatment of fungal and bacterial skin infections, inflammation, insect bites, or joint pain.

Benzoin is one element which may be used in a compound, which is known for use in treatment antiseptic, anti-bacterial, wound healing, anti-fungal, and calming.

Copaiba is one element which may be used in a compound, which is known for use in treatment wounds or skin irritations, digestive upsets, calming, and cessation of muscle spasms.

Nutmeg is one element which may be used in a compound, which is known for use in treatment muscular, calming, circulatory, and digestive upsets.

Peppermint UK/US is one element which may be used in a compound, which is known for use in treatment digestion, mental alertness, muscle and joint issues.

Yarrow is one element which may be used in a compound, which is known for use in treatment wound healing, hormonal balancing, insect repellent.

Doug fir is one element which may be used in a compound, which is known for use in treatment antibacterial, fungicide, pesticide, anti-viral properties.

In at least one embodiment, a base compound consists of one or more of, or a combination of, acetyl alcohol, steric acid, an amount of fractionated coconut oil, filtered mineral water, coconut oil, mineral salts, lecithin, or equivalents and/or combinations thereof.

It is appreciated that many combinations of plant extracts may be used along with the infusion compound. Nothing herein is intended to limit the available plant extracts included with the infusion compound.

In at least one embodiment, a treatment compound may comprise one or more extracts in acceptable amounts of Black Spruce (1.5 ml-4 ml), Canadian Balsam (1.5 ml-12 ml), Silver Fir (6 ml-12 ml); Doug Fir (6 ml-12 ml); Canadian Spruce (7 ml-14 ml), UK Peppermint (0.3 ml-3 ml), USA Peppermint (0.1 ml-10 ml), Cassia (0.1 ml-5 ml), Litsea (0.1 ml-8 ml), Manuka (0.1 ml-2 ml), Benzoin (1 ml-11 ml), Copaiba (1 ml-8 ml), Nutmeg (0.1 ml-1 ml), Yarrow (0.1 ml-5 ml), or equivalents thereof or combinations thereof.

In at least one embodiment, a treatment compound may comprise one or more extracts in acceptable amounts of Yarrow (1 ml-5 ml), Canadian Spruce (20 ml-30 ml), Black Spruce (8 ml-15 ml), Canadian Balsam (10 ml-20 ml), Silver Fir (25 ml-40 ml), Doug Fir (25 ml-40 ml), Cassia (0.1 ml-2 ml), Peppermint USA (1 ml-5 ml), Copaiba (0.1 ml-2 ml), or equivalents thereof or combinations thereof.

Apart from using inventive directly in an infusion process, it should be appreciated that the one or more possible compounds created in accordance with this invention may be bottled for individual sale or use, may be applied using conventional sprayers or spraying techniques known in the art, and may be applied directly to wound sites or imparted with creams, lotions, soaps or shampoos for washing animals to provide wound healing properties directly or through the use of such creams, lotions, soaps or shampoos.

In at least one embodiment, the one or more inventive compounds are used as an infuser in a barn to spray into the air to make the barn cleaner, or sprayed around the barn or stalls to keep critters away, directly sprayed in a stall to make it anti-viral anti-bacterial, sprayed in an animal trailer to calm the animal down and protect it while traveling, or combinations thereof.

It should be appreciated that while the forgoing benefits are from natural compounds, other non-natural compounds can afford the same or similar benefits. Thus nothing herein is intended to limit the use of compounds exclusively of natural compounds, and for the avoidance of doubt, compounds may contain natural elements, non-natural elements, or combinations thereof.

Embodiments of the compounds used herein can be used for providing a line of products for animals and human health to help together or individually to support healthy muscles, tendons and joints, reduces inflammation and pain, increase circulation. increase mobility, increase healing of muscles fibers, or combinations thereof. Additionally, some embodiments of the compounds used herein may be used to help heal cuts, sores, wounds, including hoofrot, maintain healthy skin, maintaining a healthy coat, stimulate faster healing, protect against fungal, bacterial, viral infections, or combinations thereof. Certain embodiments of compounds used herein may be used for soothing or calming anxiety in humans or animals, decreases the internal stress response, or combinations thereof. Embodiments of the compounds may further be used to support healthy respiratory and digestive function, decrease respiratory and digestive spasms, healing or protecting CPOD RAO and cough(s). Some embodiments may further be used for protection against bites and infections from insects, repelling flies, mosquitos, fleas, ticks and other carriers of diseases and parasites. Further uses of one or more compounds herein may be used as a hand cleaner and moisturizer countering airborne and surface germs as well as parasites and viruses without alcohol.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1

A method for recycling stall residuals and/or soiled animal bedding is implemented to produce a recycled animal bedding from stall residuals and/or soiled animal bedding. Soiled animal bedding is first removed from one or more animal stalls or berthing locations and transported to an area for recycling. Upon arriving at the transfer station/recycling area, the received stall residuals and/or soiled animal bedding is categorized and combined to make the best possible mix or combination for the process to be most efficient and effective, then separated to remove large items such as sticks and manure, as well as metals and foreign non-metallic items. The manure and sticks or other large sized animal bedding material is redirected for further use while the metallic and non-metallic foreign items are redirected to be crushed to a compact size and sent for disposal or recycling wherever possible.

The mixing and separation results in a separated wood shavings and bedding materials. To reduce moisture and contaminants, the separated wood shavings are directed toward a dryer. The steam from the dryer is filtered, condensed to moisture and directed to a storage tank for reuse. The dryer continues to heat the separated wood shavings at a temperature range of 190° C.-215° C. for a period of 3-9 minutes to further pasteurize or sterilize the separated wood shavings. The dried and separated wood shavings are now infused with a compound having antiviral, antibacterial, antifungal, and anti-mold properties. The infusion process is carried out through the use of an infusion tank or by spraying the wood shavings with one or more compounds using methods known in the art. The result of the aforementioned process is a recycled wood shaving infused with health-promoting/or beneficial healthy compounds and is intended to be redeployed for use as animal bedding.

Example 2

The method of Example 1 is implemented, but further includes an additional step of separating of organic matter fines from the said separated wood shavings and bedding materials. The separation of the organic matter fines is to occur after the drying step. The separated organic matter fines are diverted to join the manure or other large sized animal bedding material separated in Example 1.

Example 3

The method of Example 1 or Example 2 is implemented but includes the packaging of the recycled wood shaving infused with health-promoting compounds into bags which allows for the safe transport of the recycled bedding material, assists with storage of the materials, and reduces the risk of contamination of the recycled material when it is being transported or stored.

Example 4

The method of Example 1 or 2 is implemented but further includes producing a biomass/organic matter from said separated manure, organic matter fines, and reclaimed moisture in a bioreactor.

Example 5

The method of Example 1 or 2 is implemented but further includes the use of the compound to be infused having an amount of one or more of a base compound having one or more of, or a combination of, an amount of fractionated coconut oil, filtered mineral water, coconut oil, mineral salts, lecithin, acetyl alcohol, steric acid, or equivalents and/or combinations thereof. The infusion compound further includes plant extracts from one or more of yarrow, Canadian spruce, black spruce, Canadian balsam, silver fir, doug fir, cassia, Litsea, Manuka, Benzoin, nutmeg, peppermint UK/US, copaiba, coconut, palm oil, other organic derived oils, or combinations thereof.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:
1. A method for recycling stall residuals and/or soiled animal bedding, the method comprising:
    receiving stall residuals and/or soiled animal bedding;
    sorting and separating said stall residuals and/or soiled animal bedding resulting in separated wood shavings and manure;

adding an amount of new bulk wood shavings or other bedding material to said separated wood shavings;

reclamation of moisture from said separated wood shavings or other bedding material;

pasteurization or sterilization of said separated wood shavings or other bedding material; and infusing said separated wood shavings or other bedding material with one or more compounds.

2. The method of claim 1 wherein said sorting and separating the stall residuals and/or soiled animal bedding further comprises measuring said moisture content of said stall residuals.

3. The method of claim 1 wherein said sorting and separating the stall residuals and/or soiled animal bedding further comprises separating magnetic materials from said stall residuals and/or soiled animal bedding.

4. The method of claim 1 wherein said sorting and separating the stall residuals and/or soiled animal bedding further comprises separating manure and non-magnetic foreign materials from the stall residuals and/or soiled animal bedding, wherein said non-magnetic foreign materials is grass, hay, polymers, paper, object made from non-magnetic foreign materials and combinations thereof.

5. The method of claim 1 further comprising adding an amount of new bulk shavings or other bedding material to the stall residuals and/or soiled animal bedding prior to sorting and separating said stall residuals and/or soiled animal bedding.

6. The method of claim 1 wherein separating the stall residuals and/or soiled animal bedding further comprises:

using at least one first oscillating screen, said at least one first oscillating screen having one or more openings, to separate the stall residuals and/or soiled animal bedding wherein items within said stall residuals and/or soiled animal bedding having a length (circumference) greater than said one or more openings of said at least one first oscillating screen are separated and diverted to a separate location from the separated animal bedding; and removing non-magnetic items from said stall residuals and/or soiled animal bedding, removing manure from said stall residuals and/or soiled animal bedding, or combinations thereof;

wherein stall residuals and/or soiled animal bedding materials which are smaller than said one or more openings of said at least one first oscillating screen are transported for further processing and moisture reclamation.

7. The method of claim 1 wherein the step of reclamation of moisture from said separated wood shavings and bedding materials further comprises:

dehydrating said wood shavings or other bedding material by heating said wood shavings or other bedding material sufficient to change the state of the moisture in the wood shavings or other bedding material to a steam;

condensing said steam; and storing the condensed steam in a storage tank.

8. The method of claim 1 wherein pasteurization or sterilization of said separated wood shavings or other bedding material further comprises heating said wood shavings or other bedding material sufficient to anesthetize or eliminate a majority of pathogens, molds, contaminants, or combinations thereof.

9. The method of claim 1 wherein pasteurization or sterilization of said separated wood shavings or other bedding material further comprises ozonation of said wood shavings or other bedding material sufficient to anesthetize or eliminate pathogens or contaminants, or combinations thereof.

10. The method of claim 1 further comprising separation of one or more of organic matter fines, dust, or combinations thereof, from said separated wood shavings or other bedding material by exposing said separated wood shavings or other bedding material to one or more second oscillating screen sufficient to separate said one or more of organic matter fines, dust, or combinations thereof, from said separated wood shavings or other bedding material.

11. The method of claim 1 wherein the step of infusing said separated wood shavings or other bedding material with one or more compounds further comprises directing said separated wood shavings or other bedding material to an infusion tank and introducing one or more compounds having antiviral properties, antibacterial properties, antifungal properties, anti-mold properties, anti-odor properties or combinations thereof.

12. The method of claim 1 further comprising packaging said separated wood shavings or other bedding material.

13. The method of claim 1 further comprising producing a biomass from said separated manure, organic matter fines, dust, reclaimed moisture, or combinations thereof.

14. The method of claim 13 wherein said biomass further comprises fruit scraps, vegetable scraps, coffee grinds, food scraps, liquid carbon, enzymes, other organic materials, other animal manures, or combinations thereof.

15. A method for recycling stall residuals and/or soiled animal bedding to produce recycled animal bedding and biomass, the method comprising:

receiving stall residuals and/or soiled animal bedding;

sorting and separating said stall residuals and/or soiled animal bedding resulting in separated wood shavings and manure, wherein said separated manure is diverted to a bioreactor;

reclamation of moisture from said separated wood shavings bedding materials;

pasteurization or sterilization of said separated wood shavings and bedding materials;

separation of organic matter fines from said separated wood shavings and bedding materials, wherein said separated organic matter fines are diverted to said bioreactor to be combined with said manure;

infusing said separated wood shavings and bedding materials with one or more compounds;

packaging said separated wood shaving and bedding materials; and producing a biomass from said separated manure, organic matter fines, dust, and reclaimed moisture.

16. A method for recycling stall residuals and/or soiled animal bedding, the method comprising:

receiving stall residuals and/or soiled animal bedding;

adding an amount of new bulk shavings or other bedding material to said stall residuals and/or soiled animal bedding;

sorting and separating said stall residuals and/or soiled animal bedding resulting in separated wood shavings and manure;

reclamation of moisture from said separated wood shavings or other bedding material;

pasteurization or sterilization of said separated wood shavings or other bedding material; and infusing said separated wood shavings or other bedding material with one or more compounds.

17. The method of claim 16 wherein said sorting and separating the stall residuals and/or soiled animal bedding further comprises measuring said moisture content of said stall residuals.

18. The method of claim 16 wherein said sorting and separating the stall residuals and/or soiled animal bedding further comprises separating magnetic materials from said stall residuals and/or soiled animal bedding.

19. The method of claim 16 wherein said sorting and separating the stall residuals and/or soiled animal bedding further comprises separating manure and non-magnetic foreign materials from the stall residuals and/or soiled animal bedding, wherein said non-magnetic foreign materials is grass, hay, polymers, paper, object made from non-magnetic foreign materials and combinations thereof.

20. The method of claim 16 further comprising adding an amount of new bulk wood shavings or other bedding material to the separated wood shavings or other bedding material prior to reclamation of moisture.

21. The method of claim 16 wherein separating the stall residuals and/or soiled animal bedding further comprises:
using at least one first oscillating screen, said at least one first oscillating screen having one or more openings, to separate the stall residuals and/or soiled animal bedding wherein items within said stall residuals and/or soiled animal bedding having a length (circumference) greater than said one or more openings of said at least one first oscillating screen are separated and diverted to a separate location from the separated animal bedding; and
removing non-magnetic items from said stall residuals and/or soiled animal bedding, removing manure from said stall residuals and/or soiled animal bedding, or combinations thereof;
wherein stall residuals and/or soiled animal bedding materials which are smaller than said one or more openings of said at least one first oscillating screen are transported for further processing and moisture reclamation.

22. The method of claim 16 wherein the step of reclamation of moisture from said separated wood shavings and bedding materials further comprises:
dehydrating said wood shavings or other bedding material by heating said wood shavings or other bedding material sufficient to change the state of the moisture in the wood shavings or other bedding material to a steam;
condensing said steam; and
storing the condensed steam in a storage tank.

23. The method of claim 16 wherein pasteurization or sterilization of said separated wood shavings or other bedding material further comprises heating said wood shavings or other bedding material sufficient to anesthetize or eliminate a majority of pathogens, molds, contaminants, or combinations thereof.

24. The method of claim 16 wherein pasteurization or sterilization of said separated wood shavings or other bedding material further comprises ozonation of said wood shavings or other bedding material sufficient to anesthetize or eliminate pathogens or contaminants, or combinations thereof.

25. The method of claim 16 further comprising separation of one or more of organic matter fines, dust, or combinations thereof, from said separated wood shavings or other bedding material by exposing said separated wood shavings or other bedding material to one or more second oscillating screen sufficient to separate said one or more of organic matter fines, dust, or combinations thereof from said separated wood shavings or other bedding material.

26. The method of claim 16 wherein the step of infusing said separated wood shavings or other bedding material with one or more compounds further comprises directing said separated wood shavings or other bedding material to an infusion tank and introducing one or more compounds having antiviral properties, antibacterial properties, antifungal properties, anti-mold properties, anti-odor properties or combinations thereof.

27. The method of claim 16 further comprising packaging said separated wood shavings or other bedding material.

28. The method of claim 16 further comprising producing a biomass from said separated manure, organic matter fines, dust, reclaimed moisture, or combinations thereof.

29. The method of claim 28 wherein said biomass further comprises fruit scraps, vegetable scraps, coffee grinds, food scraps, liquid carbon, enzymes, other organic materials, other animal manures, or combinations thereof.

* * * * *